T. B. GARRETT.
MEASURING APPARATUS.
APPLICATION FILED APR. 2, 1917.
1,292,752.
Patented Jan. 28, 1919.
3 SHEETS—SHEET 1.
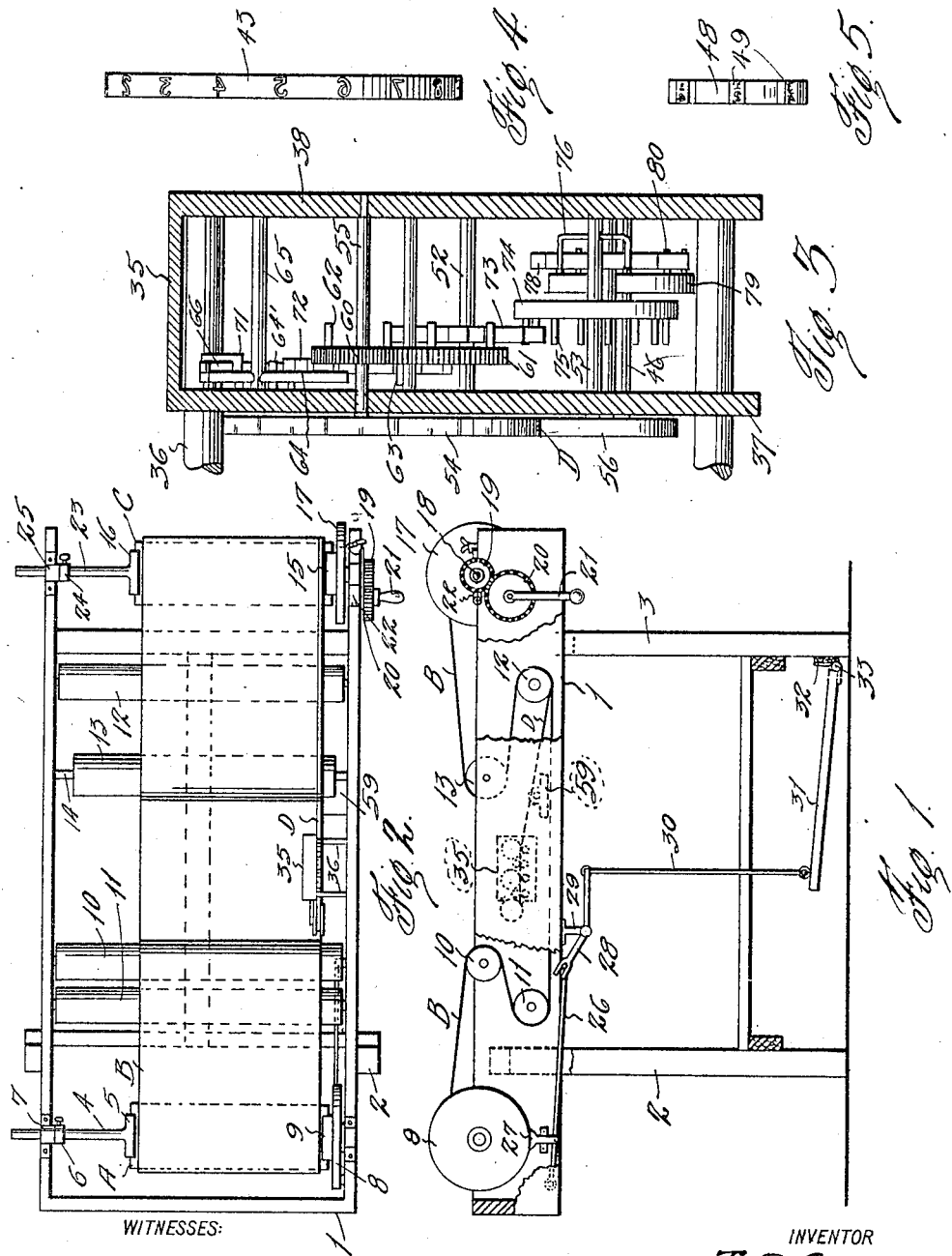
WITNESSES:
INVENTOR
T. B Garrett,
BY
ATTORNEY T. B. GARRETT.
MEASURING APPARATUS.
APPLICATION FILED APR. 2, 1917.
1,292,752.
Patented Jan. 28, 1919.
3 SHEETS—SHEET 2.
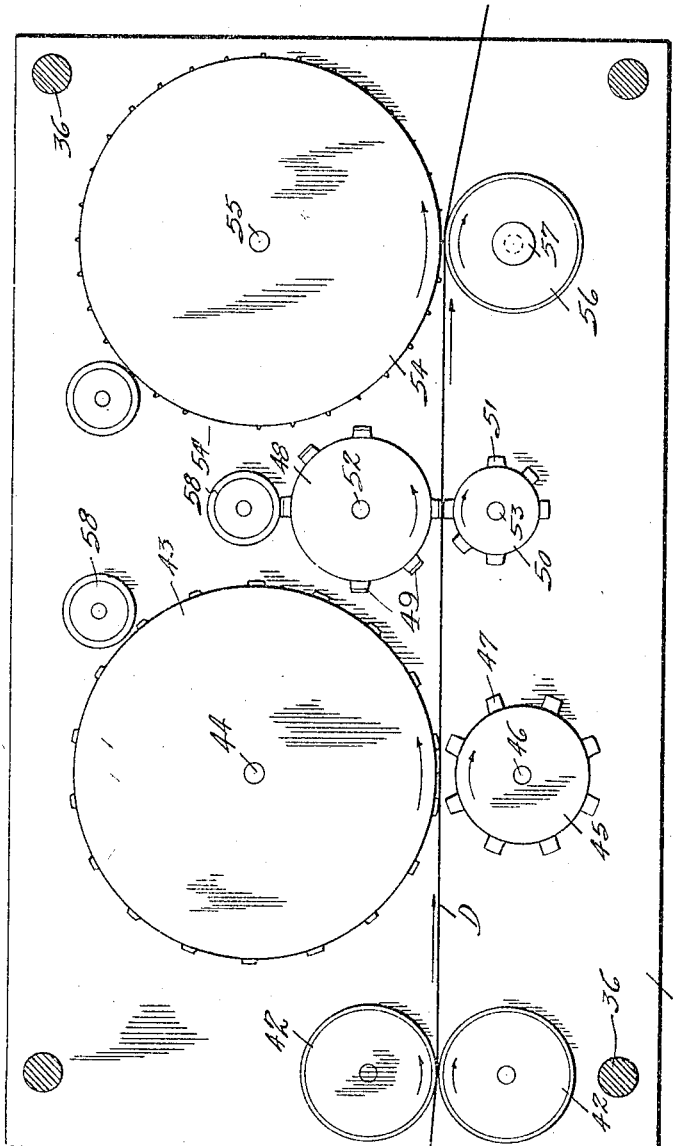
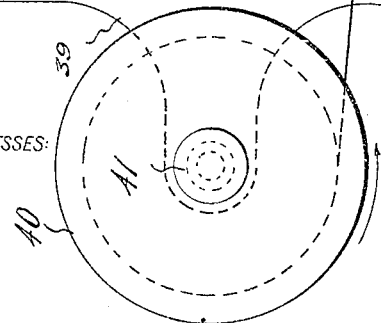
Fig. 6.
WITNESSES:
INVENTOR
T. B. Garrett,
BY
ATTORNEY

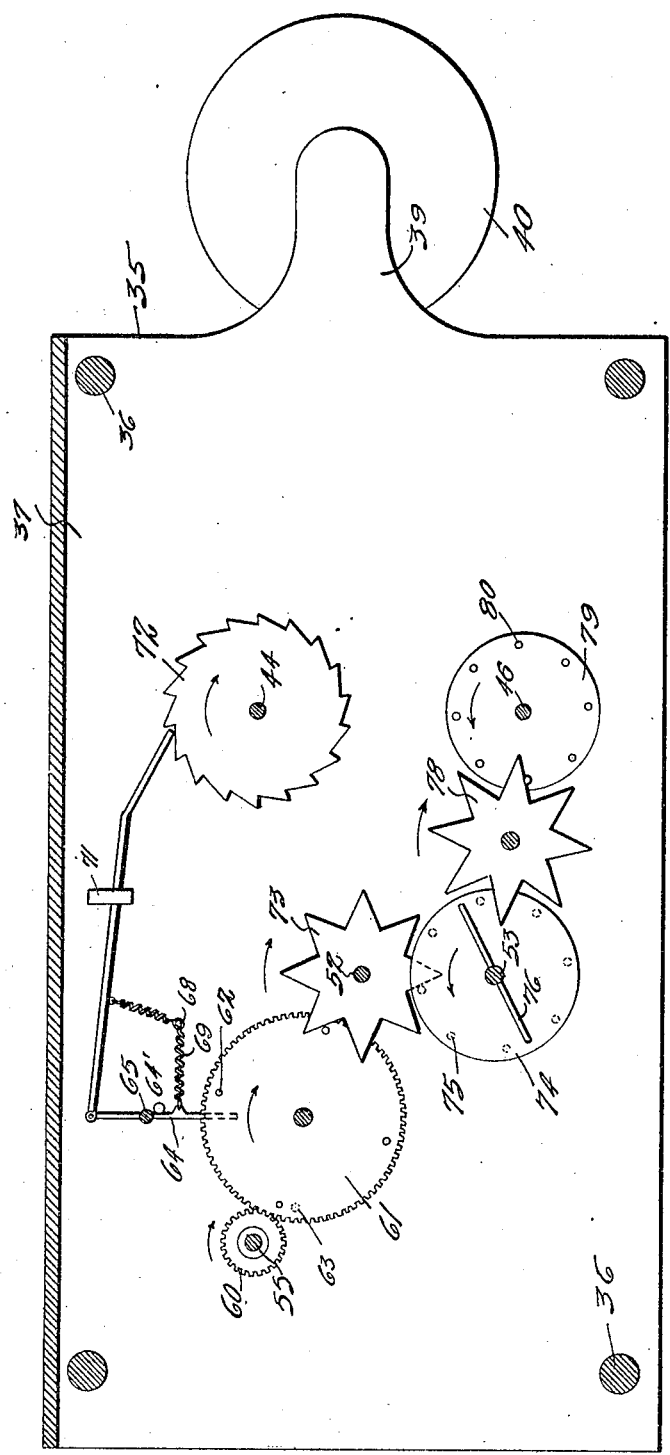

UNITED STATES PATENT OFFICE.

THOMAS B. GARRETT, OF MARSHALL, TEXAS.

MEASURING APPARATUS.

1,292,752.  Specification of Letters Patent.  Patented Jan. 28, 1919.

Application filed April 2, 1917. Serial No. 159,073.

*To all whom it may concern:*

Be it known that I, THOMAS B. GARRETT, citizen of the United States, residing at Marshall, in the county of Harrison and State of Texas, have invented certain new and useful Improvements in Measuring Apparatus, of which the following is a specification.

This invention has particular relation to devices for measuring dry goods and the like.

The idea is to provide along one edge of the goods, or other location, a tape bearing graduations of measurement whereby each yard and divisions thereof are displayed relatively on the goods, and whereby the goods may be cut to exact lengths by simply unwinding to the point on the tape indicating the desired length. The invention further contemplates securing the tape to the goods so that it can not become displaced and require remeasuring; and also the printing and applying of the tape as the goods is unwound from the bolt.

In carrying out the invention a device for printing a measuring tape is combined with a support for winding and unwinding the goods, said printing device being located relatively between the unwinding and winding elements of the apparatus.

I have found a very satisfactory construction to include a horizontal frame or support mounted on legs and a reel device at each end, both arranged to clamp the boards on which dry goods is usually wound and one being connected with gears operated by a crank handle for winding the goods. Feeding rollers are mounted in the frame between the reel devices and the goods is led over these from one reel device to the other. A tape supplying and printing device is mounted on the inner side wall of the frame and the tape is led over a moistening device to a point where the goods passes under one of the feeding rollers, whereby sufficient pressure is exerted to bind the tape on the edge of the goods. The printing device is arranged to correctly print the graduations and numerals on the tape as the goods and tape are fed through the frame. Simply by turning the crank handle the desired length of goods may be run through the apparatus, measured, cut off and wound up in a remarkably short period, further correct measurement is assured.

The invention may be carried out in numerous manners and its application may be more readily understood by a perusal of the following specification and by reference to the accompanying drawings, in which an example of the invention is illustrated and wherein:

Figure 1 is a side elevation of the apparatus,

Fig. 2 is a plan view of the same,

Fig. 3 is a vertical sectional view of the tape printing device,

Fig. 4 is a plan view of one of the printing wheels,

Fig. 5 is a plan view of another printing wheel.

Fig. 6 is an elevation of the printing device, and

Fig. 7 is a longitudinal sectional view of the same.

In the drawings the numeral 1 designates a horizontal rectangular frame supported on legs 2 and 3, respectively, but said frame could be otherwise supported. The frame is open at its forward end as shown in Fig. 2. At the rear end of the frame a reel device is mounted and includes a follower shaft 4 provided with a clamp-head 5 and an adjustable collar 6 bearing against the bearing box 7 mounted on the side of the frame and in which the shaft is journaled. A head is oppositely journaled in the frame and includes a circular brake disk 8 with a clamp member 9 at its central portion. The bolt-boards as A are clamped between the parts 5 and 9 and the goods B is led forward over a transverse roller 10, down and around another transverse roller 11 set to the rear of the roller. The goods is led forward along the bottom of the frame to a transverse pressure roller 12 from which it is carried up and rearward and over a winding guide roller 13 loosely journaled on a transverse shaft 14. The goods is then carried forward and engaged about a bolt-board C which is clamped in members 15 and 16 similar to the parts 5 and 9. The member 15 is secured to a disk 17 having a stub shaft 18 removably mounted in a bearing box 22 mounted on the frame. A pinion 19 is secured on the outer end of the shaft and meshes with a gear journaled on the outside of the frame and having a crank handle 21. By turning the handle the parts are revolved so that the goods is wound on the bolt-board C. The member 16 is fixed on the inner end of a follower shaft 23 having an adjustable collar 24 abutting the bearing box 25 in which the shaft 23 is journaled.

It will be seen that boards of different widths may be readily clamped in the reel devices. By loosely mounting the roller 13 it is capable of playing longitudinally on its shaft 14 and the operator by placing his hand on the goods as it passes over the said roller may manipulate the parts so as to properly guide the goods and keep it in line. To eliminate slack and keep the goods under a desirable tension, a brake lever 26 is pivoted on the inner side wall of the frame under the brake disk 8 and extends forward as shown. The forward end of the lever is bent laterally and engages in the forked end of an actuating lever 28 mounted in a bracket 29 depending from the frame. By pulling down on the forward end of the lever 28 its forked rear end is swung upward, thus swinging the lever 26 upward. A vertically disposed brake member 27 has its upper end adjacent the periphery of the disk 8 so that when the lever 26 is elevated the brake is applied to the disk. A rod 30 depends from the forward end of the lever 28 and is pivoted to the rear end of a foot lever 31 having its forward end mounted on a cross piece 32 by means of a spring hinge 33. The operator applies the brake by depressing the lever 31.

For supplying and printing the measuring tape a tape printing device 35 is mounted in the frame 1 adjacent one of the sides thereof. The device is spaced from the side and supported by four lateral posts 36. The said device has two vertical supporting plates or frame-members 37 and 38 respectively, spaced apart and also mounted on said posts in a suitable manner. At one end the face plate 37 has an integral flush bracket 39 on which a spool 40 is supported by a bolt 41. A narrow paper tape D is wound on the spool and led therefrom longitudinally of the face plate. The tape first passes between a pair of guide disks 42 having yieldable faces. A large disk 43 is fixed on a shaft 44 mounted in the plates 37 and 38 and is disposed over a printing wheel 45 fixed on a shaft 46 also mounted in said plates. The wheel has radial lugs 47 coöperating with the numerals on the face of the disk above. The tape passes from the disks 42 between the disk 43 and the printing wheel, which latter parts normally occupy the position shown in Fig. 6, whereby the tape is free to pass without being printed until said disk and wheel are given a partial revolution in the direction of the arrows. This causes one of the lugs 47 to press the tape against one of the numerals on the disk whereby said numeral is printed on the tape.

The tape next passes between a numeral wheel 48 having numeral bearing radial lugs 49 and a printing wheel 50 having radial lugs 51. The wheel 48 is fixed on a shaft 52 and the wheel 50 is fixed on a shaft 53. Each wheel has two sets of lugs, each comprising three lugs regularly spaced, said sets being spaced apart so as to provide a gap longer than the spaces between the lugs. These gaps are provided so that printing at certain portions of the revolution of the wheels 48 and 50 is eliminated. The numerals on the disk 43 represent yards while the lugs 49 carry numerals printing "$\frac{1}{4}$," "$\frac{1}{2}$" and "$\frac{3}{4}$" and the parts are so timed that those portions of the tape bearing the yard numerals will pass between the wheels 48 and 50 in registration with the gap portions thereof and in this way the respective markings will be properly spaced on the tape.

A second large disk 54 is next encountered by the tape. This disk has graduation marks on its face and has one gap 54' which straddles the numbers previously printed. The disk is fixed on a shaft 55 mounted in the plates and has an underlying printing disk 56 provided with a yieldable face and mounted on a stub shaft 57 projecting from the plate 37. The tape is led from the disk 56 down to the pressure roller 12 and passes under the same on the upper surface of the goods B. The printing device is preferably located so that the tape is fed in registration with the selvage edge of the goods. The tape has its under side gummed and is passed over a suitable moistening device 59 mounted on the inner wall of the side of the frame 1. On the face plate 37 are a plurality of inking rollers 58 bearing on the faces of the disks 43 and 54 and the lugs 49 of the wheel 48. The printed and moistened tape is fed to the goods and pressed thereon by the roller 12 and in this way a printed tape is affixed to the goods as it is run through the apparatus. A bolt of dry goods run through the apparatus is measured when removed and has the tape affixed to its edge throughout its entire length. This bolt may be placed on the shelves for sale and merely has to be unwound to the numeral on the tape indicating the length of the piece of goods desired. It will be seen that when the bolt of goods is removed from the apparatus the order of the value of the numerals will be reversed; as for instance in a piece 50 yards long the numeral 50 would be printed last and in unwinding the goods the clerk would have to calculate in a reverse order for the number of yards. The numerals would run 50, 49, 48, 47 and in like order down to 1. This could be avoided by again rewinding the goods after the bolt was removed from the apparatus.

It is obvious that means must be provided for properly operating the printing disks and the wheel 48. As shown in Figs.

3 and 7 a mechanism is arranged between the plates 37 and 38 for actuating said parts. This mechanism includes a pinion 60 fixed on the shaft 55 which is revolved by the disk 54, the latter being operated by tape D. A gear 61 is journaled between the plates and is driven by the pinion. This gear is of such diameter as to be revolved exactly one-quarter of a revolution during one complete revolution of the pinion. On one side of the gear four pins 62 are disposed on the quadrants of said gear, while a single pin 63 projects from the other side as is shown in Fig. 3. Once during each revolution of the gear and once during every four revolutions of the pinion, the pin 63 operates. A lever 64 mounted on a rock-shaft 65 depends into the path of said pin. This lever is held normally in a vertical position by a coiled spring 69 attached to a pin 68 projecting from the inner side of the plate 37, said spring pulling the lever against a post 64'. The upper portion of the lever above the shaft 65 is pivoted to an elongated pawl 66 which extends through a keeper 71 and engages a ratchet 72 fixed on the shaft 44 of the disk 43 which carries the yard numerals.

It will be seen that the ratchet will be operated once during every four revolutions of the pinion 60 and its disk 43 and will remain idle while the intermediate mechanism is operating. The pins 62 on the opposite side of the gear 61 engage the points of a star wheel 73 fixed on the shaft 52 on which the printing wheel 48 is also fixed. The points of the star wheel are spaced in harmony with the lugs 49 and the wheel 73 is moved by each pin 62 a sufficient distance to cause the wheel 48 to print one of its numerals at each operation of said wheel 73. A pin wheel 74 is fixed on the shaft 53 of the printing wheel 50 and has pins 75 spaced so as to be engaged by the points of the wheel 73, whereby the wheels will be operated in unison.

The wheels 48 and 50 will be operated three times between the operations of the disk 43, while the disk 54 will complete a full revolution for each operation of the wheels 48 and 50. In order to synchronize the operation of the printing wheel 45 with the operation of the disk 43 a pin disk 79 is fixed on the shaft 46 of said wheel and provided with a pin 80 for each lug of said wheel 45. A star wheel 78 is disposed between the disk 79 and the shaft 53 and has its points in the path of diametrically opposite tripping arms 76 projecting from the shaft 53, whereby the points of the star wheel 78 are engaged twice during each revolution of the wheels 50 and 74.

The foregoing description and illustration clearly express the invention, but it is to be understood that said illustration is merely an exemplification and the invention may be carried out in various other ways.

What I claim, is:

1. In a measuring apparatus, the combination with means for unwinding and rewinding a bolt of dry goods, of means for applying a measuring tape along one edge of the goods, said tape being affixed to the goods, said goods being rewound with the tape, whereby it is automatically measured when again unwound.

2. In a measuring apparatus, a support, mechanism for conducting a piece of dry goods over the support which includes a plurality of rollers over which the dry goods is passed, and means for propelling the goods longitudinally, and mechanism for applying and affixing a measuring tape to the goods as it traverses the support, which includes a tape supplying and printing device, a moistening device in the path of the tape, and means for retarding the travel of the goods over the rollers.

3. In a measuring apparatus, the combination of a longitudinal frame, a bolt unwinding structure at one end of the frame including a brake disk, and a bolt rewinding structure at the other end of the frame including a revoluble winding member, and means for revolving said member, a brake arranged to engage the brake disk of the unwinding structure, means for operating the brake, a plurality of transverse rollers mounted in the frame and over which the dry goods is fed from the unwinding structure to the rewinding structure, and mechanism located on the frame between said structures for affixing a measuring tape to the goods including a device for supplying and printing a gummed tape, means for moistening the tape, and a roller for pressing the moistened tape on the goods.

4. In a measuring apparatus, a support, means for unwinding and rewinding a bolt of goods mounted on the support, means located on the support between the unwinding and rewinding means for supplying a gummed tape, a device mounted on the support for moistening the tape, and means mounted on the support for affixing the tape to the goods, whereby said goods is rewound with the tape and is automatically measured when again unwound.

In testimony whereof I affix my signature.

THOMAS B. GARRETT.

Copies of this patent may be obtained for five cents each, by addressing the "Commissioner of Patents, Washington, D. C."